United States Patent
Neuman

[15] 3,688,611
[45] Sept. 5, 1972

[54] DEVICE FOR MACHINING INSIDE SPHERICAL SURFACES ESPECIALLY FOR VERTICAL LATHE

[72] Inventor: Marcel Neuman, Collonges-au-Mont-d'Or, France

[73] Assignee: Societe Cnmp-Berthiez, Paris, France

[22] Filed: Aug. 21, 1970

[21] Appl. No.: 66,024

[30] Foreign Application Priority Data

March 9, 1969 France.....................6930079

[52] U.S. Cl. .........................................82/12, 82/2 D
[51] Int. Cl. ...............................................B23b 5/40
[58] Field of Search...............................82/12, 2 D

[56] References Cited

UNITED STATES PATENTS

| 2,821,873 | 2/1958 | Alsman et al. | 82/12 X |
| 2,191,409 | 2/1940 | McMenamin | 82/12 X |
| 508,640 | 11/1893 | Riddell | 82/12 X |
| 2,933,965 | 4/1960 | Murphy | 82/12 |
| 3,345,893 | 10/1967 | Holdridge | 82/12 |
| 2,250,161 | 7/1941 | Johnson | 82/12 |
| 1,478,686 | 12/1923 | Teller | 82/2 D |

*Primary Examiner*—Leonidas Vlachos
*Attorney*—Stevens, Davis, Miller & Mosher

[57] ABSTRACT

For machining internal spherical surfaces on a vertical lathe in which the object to be machined is mounted on a rotatable platform and a tool is pivotally mounted on a plane passing through the axis of rotation of the object in such a way that the end of the tool describes a circular path around a pivotal axis perpendicular to the axis of rotation of the object, a frame is fixed below the cross-piece of the lathe and carries a pivotally mounted carriage having on its front face a movable slide which can follow an axis parallel to the axis of the lathe spindle and has at one end a movable tool carrier, the said carriage pivoting and its slide being offset laterally relative to the normal tool carrier of the lathe.

6 Claims, 4 Drawing Figures

DEVICE FOR MACHINING INSIDE SPHERICAL SURFACES ESPECIALLY FOR VERTICAL LATHE

The present invention relates to an apparatus for machining internal spherical surfaces of a vertical lathe.

The formation of spherical surfaces by machining on a vertical lathe presents, in certain cases, numerous difficulties. If the sphere is several meters in diameter the movement of the sliding carriage becomes very considerable and may exceed the capacity of the machine. Moreover, during machining the sliding carriage of a vertical lathe undergoes a degree of flexing which reduces its rigidity resulting in a limitation of cutting force which gives rise to a prejudicial effect on production. Furthermore the flexibility of the sliding carriage results in a reduction of the accuracy of the spherical surfaces thus machined.

Machines are known for the machining of large spherical surfaces which are specially adapted for this work and which form a hemisphere by guided movements made in numerical order, along two axes perpendicular to each other and passing through the center of the sphere; they have in particular a central column carrying a sliding tool support and slidably mounted across the rotatable platform of the lathe.

Such a machine is adapted to form a sphere having openings in members turned towards the base, that is to say the axis of the sphere is positioned as close as possible to the rotatable platform. However, the horizontal sliding carriage of the machines operates in the same way as the sliding carriage of a vertical lathe and thus has the same limitations as previously described. Nevertheless, it is possible to have a machine especially adapted for this use but this involves installation costs of considerable magnitude.

The apparatus according to the present invention has been specially designed for use with an ordinary vertical lathe with one or two uprights which can be used normally for other machining operations.

There is also known a machining process which consists in mounting the object to be machined on the rotatable platform of the lathe and causing the tool to pivot in a plane passing through the axis of rotation of the object in such a way that the end of the tool describes a circular path around a pivotal axis perpendicular to the axis of rotation of the object. The devices used on conventional horizontal lathes for the application of this process comprise a member for supporting the tool which is pivotally mounted, following an axis perpendicular to the axis of the rotatable lathe spindle on the bench or on a carriage. However, these devices are mainly intended to be used for machining spherical surfaces of small dimensions on horizontal lathes and they must be dismantled in order to permit the machining of objects of different shape with tools mounted on the normal carriages of the lathe.

The device of the invention is particularly adapted for machining internal spherical surfaces of large dimensions on a vertical lathe with one or two uprights and it permits the formation of internal hemispheres of different diameters while retaining the same cutting capacity and the same accuracy.

Moreover the device according to the invention may be used at the same time as the normal carriage of a vertical lathe, thereby permitting the productivity of the machine to be increased and retaining it, when it is not used to form internal spherical surfaces, for all its normal operations.

According to the present invention, the apparatus comprises a frame adapted to be secured below the cross piece of a vertical lathe and on which is adapted to be pivotally mounted around an axis perpendicular to the axis of the lathe platform, a carriage comprising on its front face a movable slider adapted to follow an axis parallel to the axis of the lathe spindle and provided at one end with a movable tool carrier, the said carriage pivoting and its slide being adapted to be offset laterally with respect to the normal tool carrier of the lathe.

In generating the spherical surface by pivotal movement of the carriage, there is obtained maximum accuracy much higher than that obtained with devices moving along two relatively perpendicular axes.

Other features of the invention will appear from the description which follows given by way of example and made with reference to the accompanying drawings in which.

Figure 1:
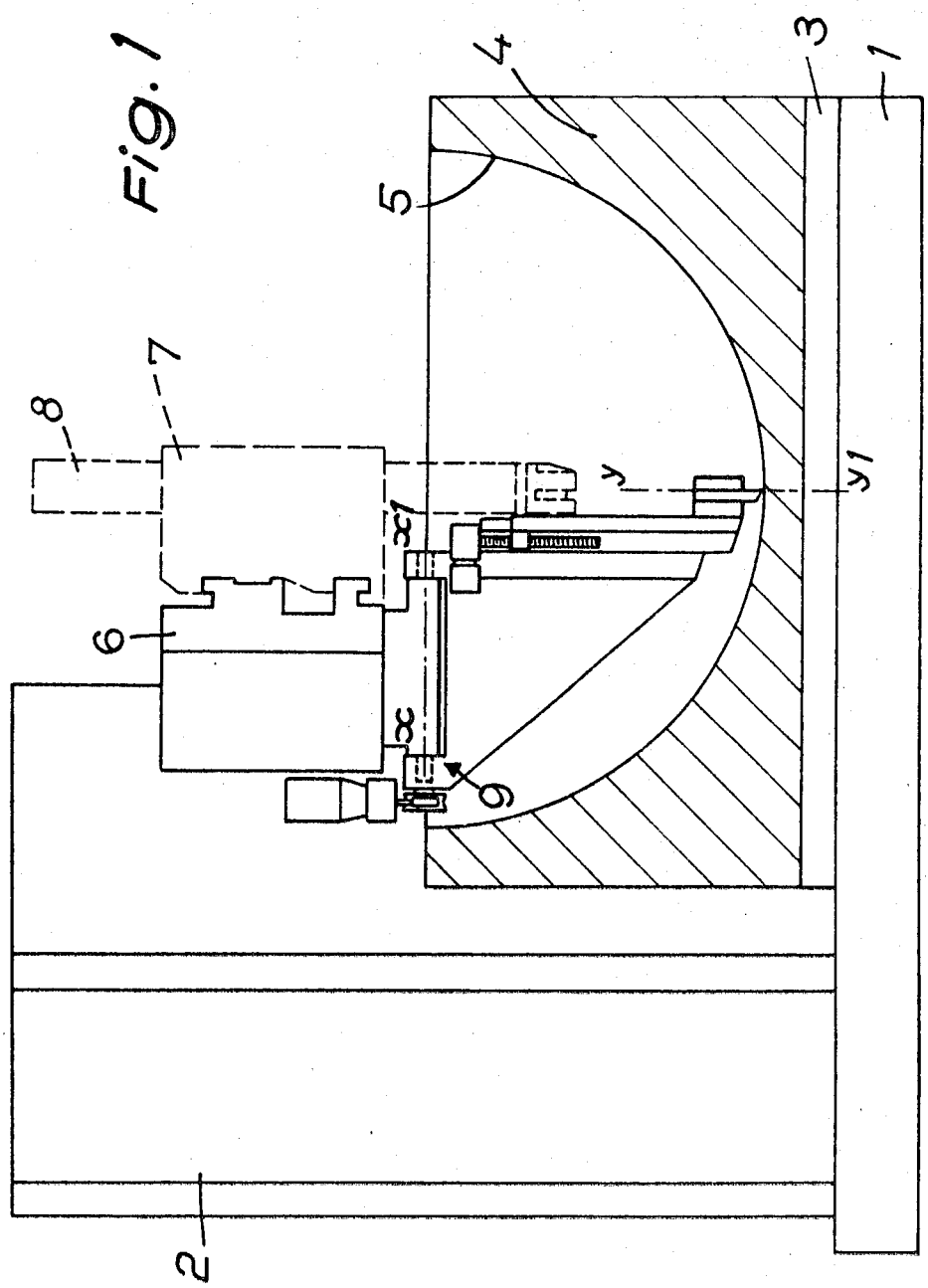
FIG. 1 is an assembly view of a vertical lathe on which is mounted one form of apparatus for machining a spherical surface.

FIG. 1 shows a vertical lathe comprising a base 1 which supports in known manner an upright 2, and a rotatable platform 3 on which is mounted an object 4 to be machined with an internal hemispherical surface 5. On the upright 2 is vertically slidably mounted a cross-piece 6 which carries a transversely movable carriage 7 and on which is mounted an upright 8 carrying at its end a tool carrier of known construction.

The apparatus 9 of the invention for producing the internal spherical surface 5 is mounted under the cross-piece 6 of the machine.

Figure 2:
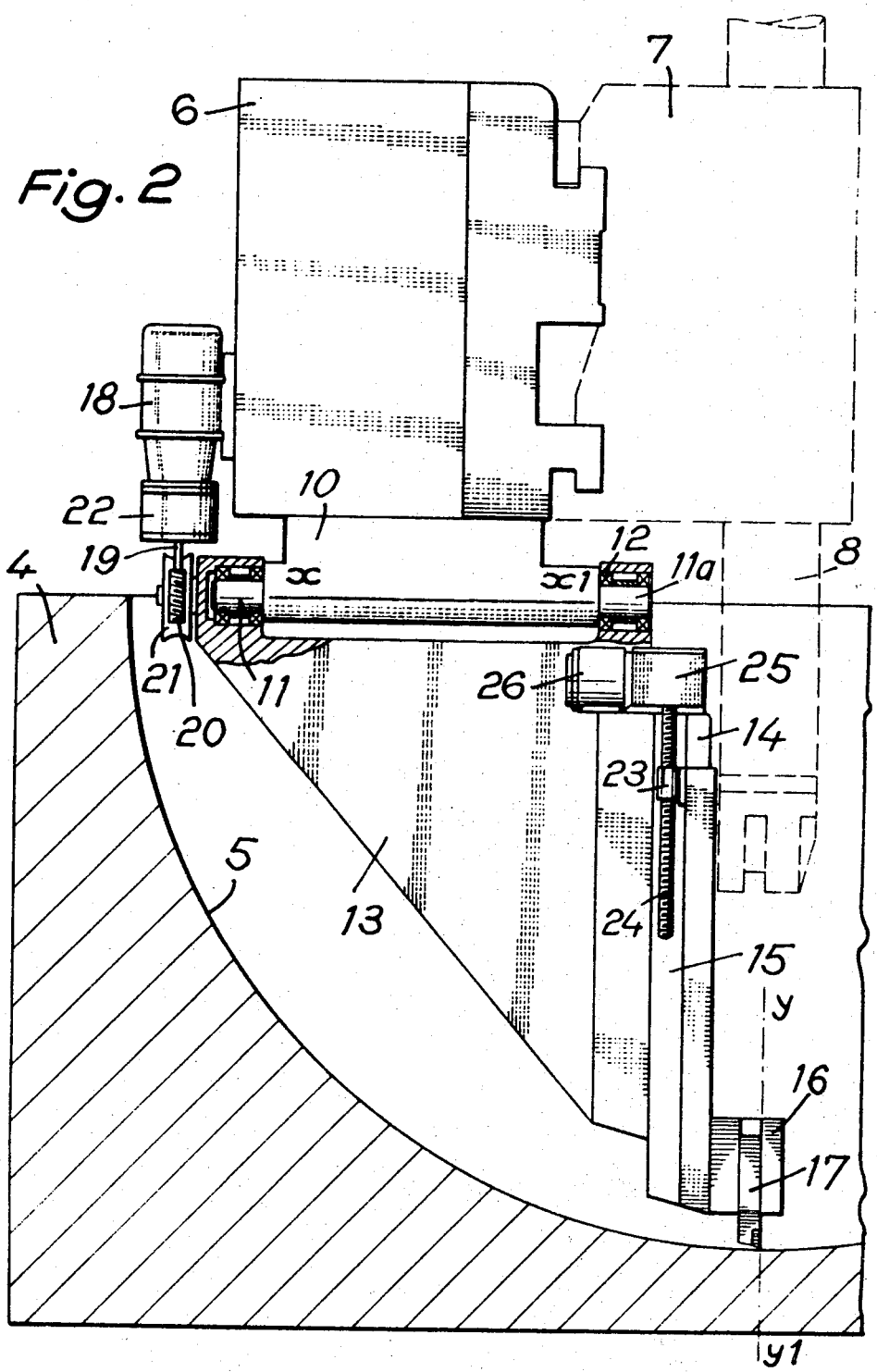
FIG. 2 is a view in side elevation of the apparatus of FIG. 1.
Figure 3:
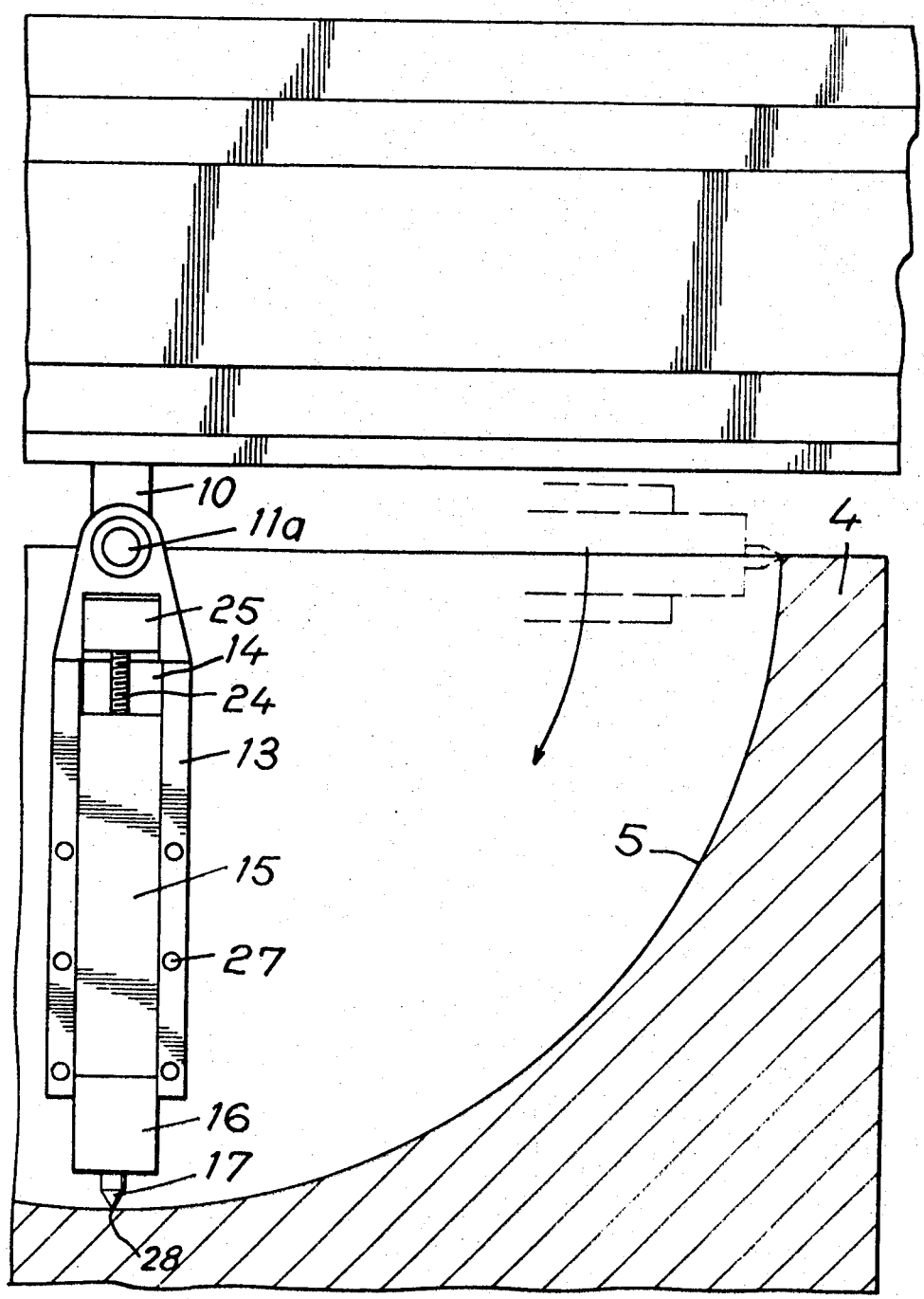
FIG. 3 is a view of the apparatus offset at 90° to the plane of FIG. 2.

This apparatus is shown in detail in FIGS. 2 and 3 and comprises a frame 10 secured under the cross-piece 6 and provided with two trunnions 11, 11a on which is pivotally mounted by means of ball bearings 12 a carriage 13 of which the pivotal axis $x—x1$ is arranged perpendicular to the axis $x—y1$ of the platform and on which is mounted the object 4 to be machined. The axis $x—x1$ may be either perpendicular or parallel to the sliding plane of the cross-piece 6. In FIGS. 1, 2, 3 and 4 this axis $x—x1$ is shown perpendicular to the plane of sliding.

The pivotable carriage 13 has a slideway 14 in which is guided along an axis parallel to the axis $y—y1$ of the platform 3 a slider 15 carrying at one of its ends a movable tool carrier 16 provided with a working tool 17 for forming the spherical surface 5.

The carriage 13 and its slider 15 are offset laterally with respect to the slide 8 and the normal tool carrier of the lathe in such a way as to permit manufacture by means of the slider 8 when the carriage 13 is arranged in a non-operative position.

On the cross-piece 6 is mounted a drive comprising a variable speed electrical or hydraulic motor 18 and a reduction gear 22 of which the shaft 19 carries an endless screw 20 which is engaged with a wheel 21 integral with the carriage 13 and the axis of which is coincident with the pivotal axis $x-x1$ of the carriage 13. This drive permits a continuous and adjustable rotation to be communicated to carriage 13.

Carriage 15comprises a nut 23 in which is engaged an endless screw 24 rotatably driven through a reduction speed gear 25coupled to an electric or hydraulic motor 26 mounted on carriage 13. These means permit the movement of the slide 15 guided in the slideway 14, in order to adjust its position in relation to the diameter of the surface 5 to be machined. Slide 15 can be fixed in position on carriage 13 by means of members 27 (FIG. 3).

To machine the internal spherical surface 5 when the position of the tool 17 is adjusted to the diameter to be formed, platform 3 of the lathe is rotated around its axis $y-y1$ and the carriage 13 is actuated by the drive 18, 22 the endless screw 20 and the wheel 21 so that it pivots around its axis $x-x1$. Moreover, as the tool 17 pivots in a plane passing through the axis of rotation of platform 3, the point 28 of tool 17 describes a circular path in the direction of the arrow F (FIG. 3) in order to form the spherical surface 5 the radius of which is equal to the adjustable distance of the point 28 from the tool 17 of the axis $x-x1$ of pivotal movement of carriage 13.

The vertical movement of cross-piece 6 permits the relative position of the center of the spherical surface 5 to be adjusted in relation to platform 3 of the lathe.

Figure 4:
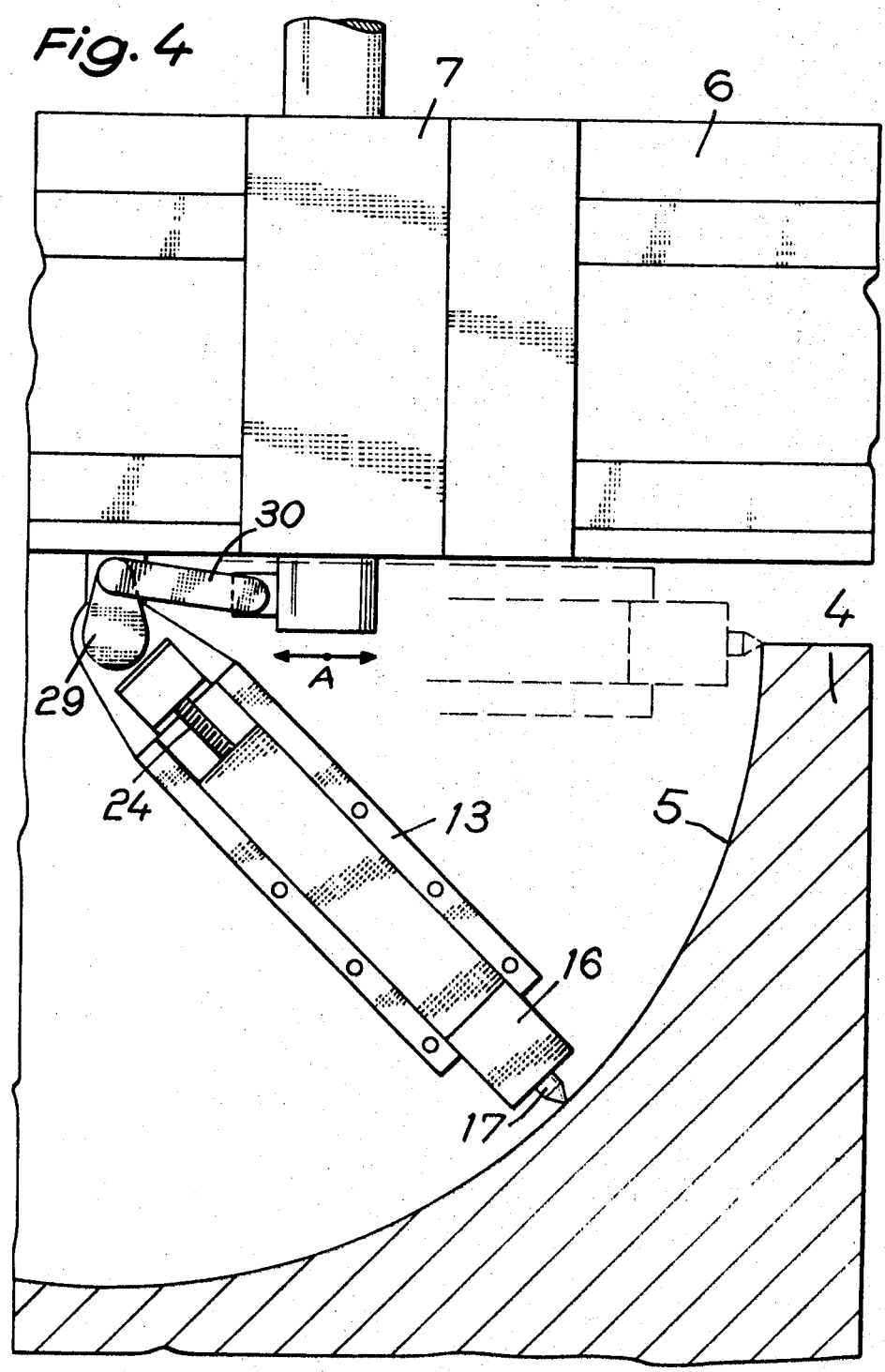
FIG. 4 is a view in elevation of a modified form of apparatus.

In an alternative form of embodiment shown in FIG. 4, the carriage 13 is provided with a lever 29 positioned at one end along the pivotal axis $x-x1$ of the carriage, the other end being pivoted on an arm 30 which is itself pivoted on the slide 8. Upon longitudinal movement of the carriage 7 carrying slide 8 over cross-piece 6 in the direction of the double arrow A, the arm 30 and the crank 29 ensure pivotal movement of carriage 13 around its axis $x-x1$.

I claim:

1. An apparatus for machining internal spherical surfaces on a vertical lathe of the type wherein a work-holder turntable is arranged to rotate about a vertical axis and a tool carrying cross-piece is arranged to travel vertically along a path parallel to said vertical axis, said apparatus comprising a frame, a carriage swingably mounted on said frame about a horizontal axis, a tool holder mounted on said carriage for linear movement thereon perpendicularly to said horizontal axis, a drive means for swinging said carriage on said frame through an arc of at least 180°, said apparatus being mountable on the underpart of the cross-piece of an aforementioned vertical lathe with said horizontal axis residing in the same plane with the rotational axis of the lathe turntable.

2. A vertical lathe, comprising: a work-holding turntable rotatable about a vertical axis, a tool carrying cross-piece movable linearly parallel to said vertical axis, said cross-piece having an underside facing said turntable and vertically spaced therefrom; a carriage attached to said underside of said cross-piece, said carriage being pivotable on said cross-piece through an arc of at least 180° about a horizontal axis which intersects said vertical axis, a tool holder mounted on said carriage and pivotable therewith, drive means to pivot said carriage relative to said cross-piece while simultaneously said cross-piece is maintained stationary and said turntable rotates whereby a cutting tool on said tool holder would cut a spherical recess in a work-piece mounted on said turntable.

3. The lathe of claim 2, wherein said tool-holder is adjustably movable along said carriage perpendicularly to said horizontal axis so as to vary the diameter of the aforementioned spherical recess.

4. The lathe of claim 2, said drive means comprising a variable speed drive means operable independently of any drive means of said cross-piece.

5. The lathe of claim 2, said drive means comprising a worm and wheel combination, the wheel being mounted integrally with said carriage.

6. The lathe of claim 2, a slide being mounted on said cross-piece for horizontal movement thereon perpendicularly to said horizontal axis, said slide in turn carrying a tool-holder movable vertically on said slide, said drive means comprising a linkage means connecting said slide with said carriage whereby horizontal movement of said slide effects a pivoting of said carriage about said horizontal axis.

* * * * *